United States Patent
Allen et al.

(10) Patent No.: US 8,640,143 B2
(45) Date of Patent: Jan. 28, 2014

(54) METHOD AND SYSTEM FOR PROVIDING PREEMPTIVE RESPONSE ROUTING

(75) Inventors: Corville O. Allen, Morrisville, NC (US); Christopher Shane Claussen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 12/029,781

(22) Filed: Feb. 12, 2008

(65) Prior Publication Data
US 2009/0204973 A1    Aug. 13, 2009

(51) Int. Cl.
*G06F 3/00*    (2006.01)

(52) U.S. Cl.
USPC .................... 719/310; 719/313; 719/315

(58) Field of Classification Search
None
See application file for complete search history.

(56) References Cited

U.S. PATENT DOCUMENTS

| | | | | |
|---|---|---|---|---|
| 6,111,881 | A | 8/2000 | Soncodi | 370/395.32 |
| 6,603,849 | B2 | 8/2003 | Lin et al. | 379/221.01 |
| 2002/0112050 | A1 | 8/2002 | Ullmann et al. | 709/224 |
| 2004/0133656 | A1 | 7/2004 | Butterworth et al. | 709/219 |
| 2005/0265231 | A1 | 12/2005 | Gunther et al. | 347/221.01 |
| 2006/0047742 | A1 | 3/2006 | O'Neill et al. | 709/203 |
| 2006/0069946 | A1* | 3/2006 | Krajewski et al. | 714/6 |
| 2006/0167828 | A1 | 7/2006 | Di Luoffo et al. | 706/60 |
| 2007/0041327 | A1* | 2/2007 | Foster et al. | 370/242 |
| 2008/0034414 | A1* | 2/2008 | Mao et al. | 726/13 |
| 2010/0138531 | A1* | 6/2010 | Kashyap | 709/224 |

FOREIGN PATENT DOCUMENTS

EP    234191 A2    9/1987    .............. H04L 12/56

OTHER PUBLICATIONS

"Interoperability Solutions for JMS and WebSphere MQ", BEA, 2007, pp. 1-28.*
"On Designing an Asynchronous and Dynamic Platform for Solving Single Task Requests of Remote Applications", Frincu, 2008, pp. 1-7.*

* cited by examiner

*Primary Examiner* — Tuan Dao
(74) *Attorney, Agent, or Firm* — Konrad Raynes Davda & Victor LLP; Janaki K. Davda

(57) ABSTRACT

A computer program product comprises a computer usable medium. The computer usable medium has a computer readable program such that when the computer readable medium is executed on a computer, the computer is caused to receive a request from a calling service. Further, the computer is caused to determine reply-to endpoint information from the request. The reply-to endpoint information indicates the calling service as a calling service response endpoint. In addition, the computer is caused to monitor functionality of the calling service. The computer is also caused to update the reply-to endpoint information to indicate an alternative calling service as the calling service response endpoint if the functionality of the calling service is impaired prior to availability of response data for composition of a response.

24 Claims, 5 Drawing Sheets

METHOD AND SYSTEM FOR PROVIDING PREEMPTIVE RESPONSE ROUTING

BACKGROUND

1. Field

This disclosure generally relates to software. More particularly, the disclosure relates to response routing.

2. General Background

Many systems are service based. The services in these systems are typically request/response based services. In other words, a requesting service can make a request for the service and a responding service provides a response back to the requestor. These systems typically allow the request and/or response to be transmitted and/or received asynchronously. As a result, various problems can occur. For example, the response of the responding service may not be sent immediately, which can result in delay. When the response is eventually transmitted, it is typically sent along the same protocol and to the original requesting service. By the time that the response is transmitted, the original requesting service may no longer be available. For instance, the original requesting service may down because of technical difficulties. Accordingly, the original requesting service may experience a prolonged delay in receiving the response or may not even receive the response at all as the response may get lost.

Current approaches allow these systems to fail when these problems arise. A recovery or compensation mechanism may then be utilized to re-route the message after the original response invocation has failed. These approaches are costly and do not prevent future problems from occurring.

SUMMARY

In one aspect of the disclosure, a computer program product comprises a computer usable medium. The computer usable medium has a computer readable program such that when the computer readable medium is executed on a computer, the computer is caused to receive a request from a calling service. Further, the computer is caused to determine reply-to endpoint information from the request. The reply-to endpoint information indicates the calling service as a calling service response endpoint. In addition, the computer is caused to monitor functionality of the calling service. The computer is also caused to update the reply-to endpoint information to indicate an alternative calling service as the calling service response endpoint if the functionality of the calling service is impaired prior to availability of response data for composition of a response.

In another aspect of the disclosure, a process is provided. The process receives a request from a calling service. Further, the process determines reply-to endpoint information from the request. The reply-to endpoint information indicates the calling service as a calling service response endpoint. In addition, the process monitors functionality of the calling service. The process also updates the reply-to endpoint information to indicate an alternative calling service as the calling service response endpoint if the functionality of the calling service is impaired prior to availability of response data for composition of a response.

In yet another aspect of the disclosure, a system is provided. The system has a request handler that receives a request from a calling service and determines reply-to endpoint information from the request. The reply-to endpoint information indicates the calling service as a calling service response endpoint. Further, the system has a response service monitor that monitors functionality of the calling service. In addition, the system has a configurable alternative response service that updates the reply-to endpoint information to indicate an alternative calling service as the calling service response endpoint if the functionality of the calling service is impaired prior to availability of response data for composition of a response.

DRAWINGS

The above-mentioned features of the present disclosure will become more apparent with reference to the following description taken in conjunction with the accompanying drawings wherein like reference numerals denote like elements and in which.

DETAILED DESCRIPTION

A method and system are provided that reroute a response, if needed, to another endpoint of a service provider. Further, the rerouting is performed automatically and preemptively. As a result, the problems associated with the potential of delay in asynchronous transmission are avoided.

In one embodiment, a response to an asynchronous-based request from a calling service is preemptively rerouted. The asynchronous-based request may be from an endpoint, such as a calling service, to another endpoint or protocol. Further, the calling service may have determined in the event that the normal response service is no longer available. The preemptive rerouting of the response provides the ability to route a message to a completely different endpoint than the normal response service that may be more robust or configurable. Further, the preemptive rerouting of the response provides the ability to avoid situations where there needs to be a recovery process or a manual resubmission of responses to requests. In addition, by providing more configurability, the preemptive rerouting of the response increases the likelihood that a valid response will be received by the calling service. The preemptive rerouting can also be utilized across different protocols and services.

Figure 1:
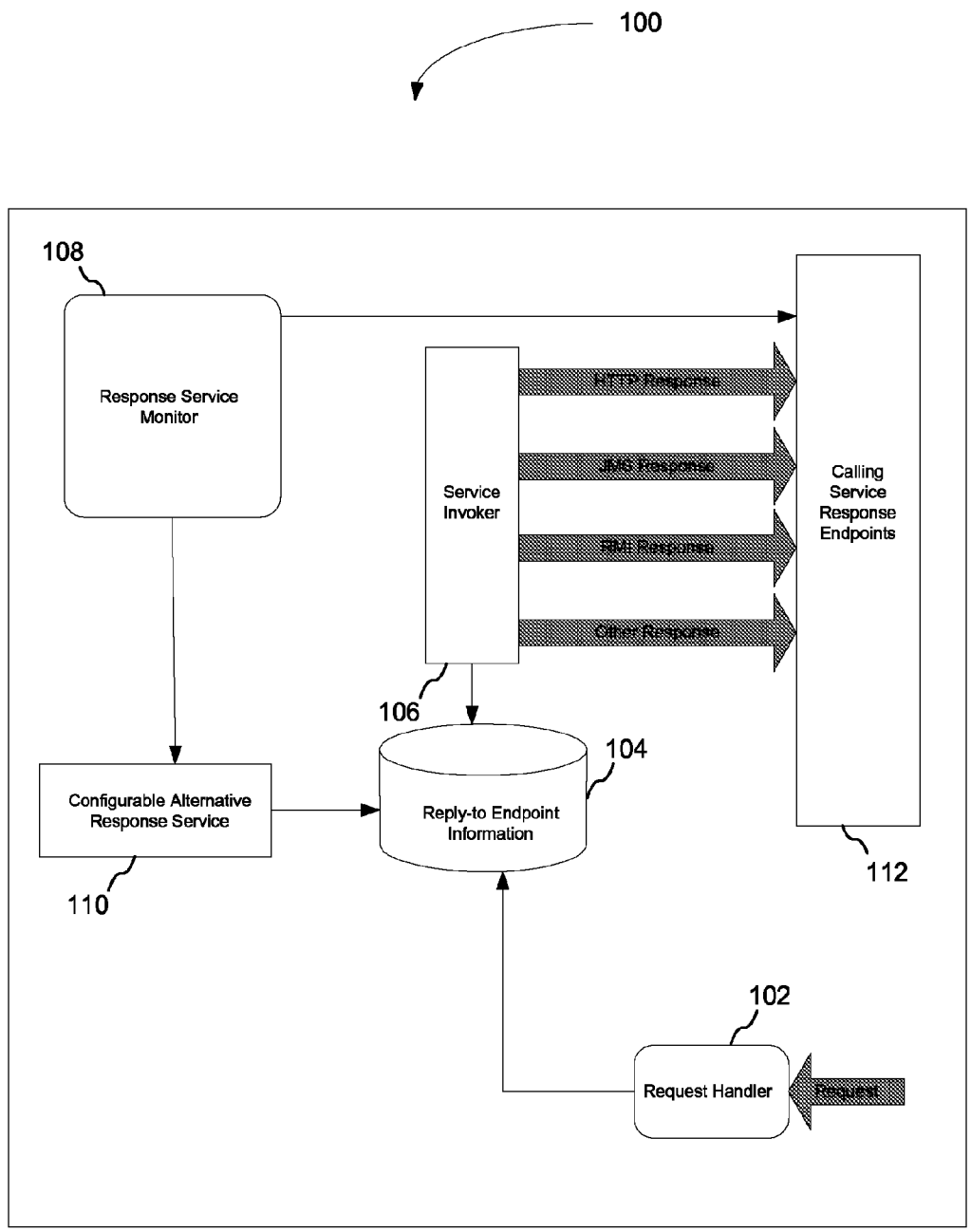
FIG. 1 illustrates a preemptive response architecture.

FIG. 1 illustrates a preemptive response architecture 100. The preemptive response architecture 100 includes a request handler 102 that receives a request from a calling service. In one embodiment, the request is asynchronously transmitted to the request handler 102. The request handler 102 then provides reply-to endpoint information corresponding to the request in a persistent storage medium 104. The reply-to endpoint information may be stored in a database, file system, repository, etc. in the storage medium 104. The reply-to endpoint information may include information such as the address or endpoint to which the response should be sent, the protocol to utilize for sending the response, and the service type.

Further, a response service monitor 108 is a heartbeat service or ping service that monitors the health and availability of each endpoint for the request/response service. If the response service monitor 108 determines that an endpoint is not functioning properly, the response service monitor 108 provides information regarding the non-functioning endpoint to a configurable alternative response service 110. The configurable alternative response service 110 has one or more alternative responses for each of the endpoints. Accordingly, in one embodiment, the configurable alternative response service 110 automatically updates the reply-to endpoint information for the non-functioning endpoint with a configurable and available response endpoint. When the response is ready to be sent, the updated reply-to endpoint information 104 is loaded.

The reply-to information, whether original or updated, indicates a service invoker 106 and a calling service endpoint 112. The service invoker 106 sends the response to the calling service endpoint 112. In one embodiment, a protocol, e.g., HTTP, Java™ Message Service ("JMS"), Java™ Remote Method Invocation ("RMI"), etc., may be specified for sending the response to the calling service endpoint 112.

The configurable alternative response service 110 may be a database, file system, or repository that stores the alternative responses. In one embodiment, the alternative responses are statically defined. For example, a user may manually store the alternative responses by providing one or more alternative endpoints. In another embodiment, the alternative responses are dynamically defined. For example, the alternative response service 110 may call a service that utilizes a registry, e.g., Universal Description, Discovery and Integration ("UDDI"), or a repository that provides an alternative.

Figure 2:
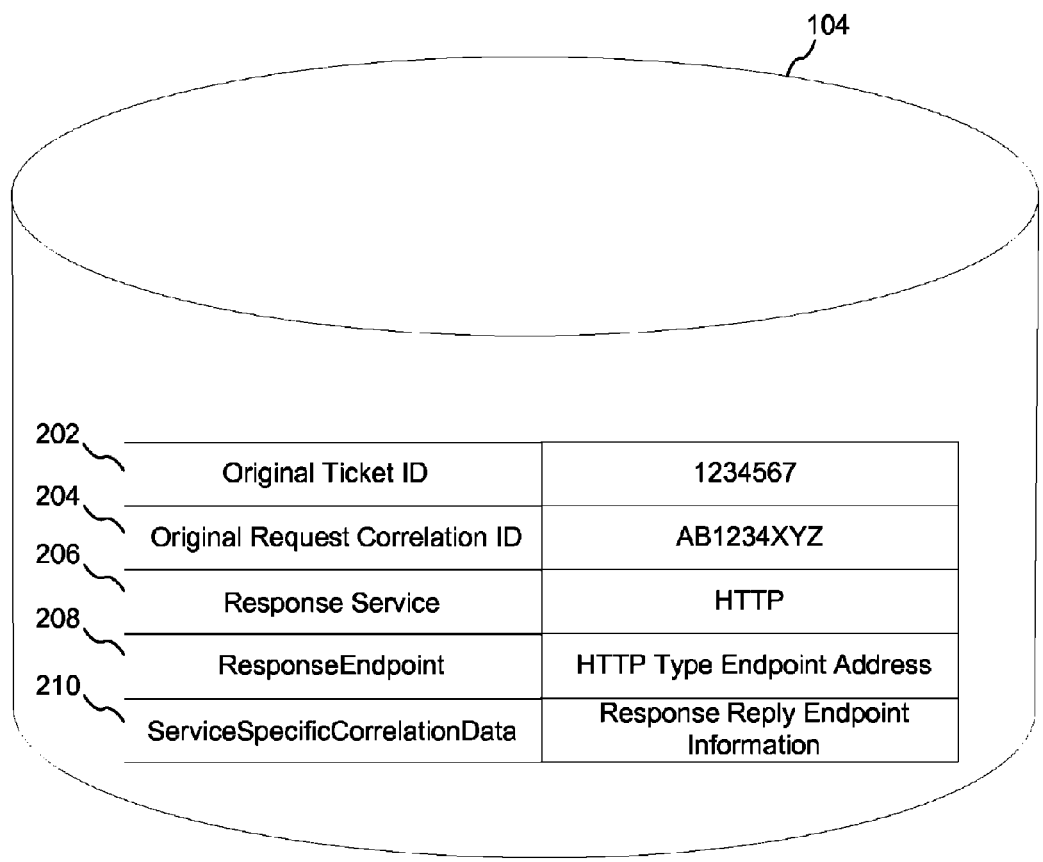
FIG. 2 illustrates an example of the reply-to endpoint information stored in the storage medium.

FIG. 2 illustrates an example of the reply-to endpoint information stored in the storage medium 104. In one embodiment, the reply-to endpoint information has a plurality of fields that may include an Original Ticket Identifier ("ID") field 202, an Original Request Correlation ID field 204, a ResponseService field 206, a ResponseEndpoint field 208, and a ServiceSpecificCorrelationData field 210. As shown in FIG. 1, the request handler 102 obtains this information from the request to store in the storage medium 104. The reply-to endpoint information includes the information that is utilized by the service invoker 106 to correlate the response to the calling service response endpoint 112.

The Original Ticket Identifier ID field 202 is utilized to identify the calling request and response by id. For example, the Original Ticket Identifier ID field 202 may include "1234567." Further, the Original Request Correlation ID field 204 is utilized to correlate the response to the correct request. For example, the Original Request Correlation ID field 204 may include "AB1234XYZ." In addition, the Response Service field 206 identifies the type of service that should be utilized to send the response. For example, the Response Service 206 may include "HTTP." The ResponseEndpoint field 208 indicates a protocol or service specific location of where the response should be sent. For example, the ResponseEndpoint field 208 may include "HTTP Type Endpoint Address." Finally, the ServiceSpecificCorrelationData field 210 indicates any additional information that is utilized for the type of service. This additional information may include configuration information, special correlation information, and any other information utilized in the interaction of the service invoker 106 with the calling service response endpoint 112. For example, the ServiceSpecificCorrelationData field 210 may include "Response Reply Endpoint Information." In one embodiment, any two of the fields of the reply-to endpoint information may be utilized by the service invoker 106 to determine how to send the response back to the calling service response endpoint 112.

As the reply-to endpoint information is configurable across protocols and platforms, the different fields of the reply-to endpoint information may include different types and/or different amounts of information based on different protocols.

For instance, the ResponseService field 206 may indicate that JMS is the type of service that should be utilized to send the response. The Response Endpoint field 208 may indicate that "JMS Type EndpointAddress" is the service specific location of where the response should be sent. Since "JMS Type EndpointAddress" may include different types of information than "HTTP Type Endpoint Address," the Response Endpoint field 208 is configurable to accommodate the different information. For example, the Response Endpoint field 208 may have sub-fields for "JMS Type EndpointAddress" to indicate that Messaging Host is "9.10.10.10," Destination is "responseQueue," and ConnectionFactory is "respCF."

In one embodiment, the service invoker 106 queries a repository, e.g., the storage medium 104, having the reply-to endpoint information based on the Original Ticket Identifier field 202 for a request to retrieve the reply-to endpoint information. The reply-to endpoint information is then analyzed to determine which service to send the response by. That service is then invoked by the service invoker 106 with the data to be sent back.

Figure 3:
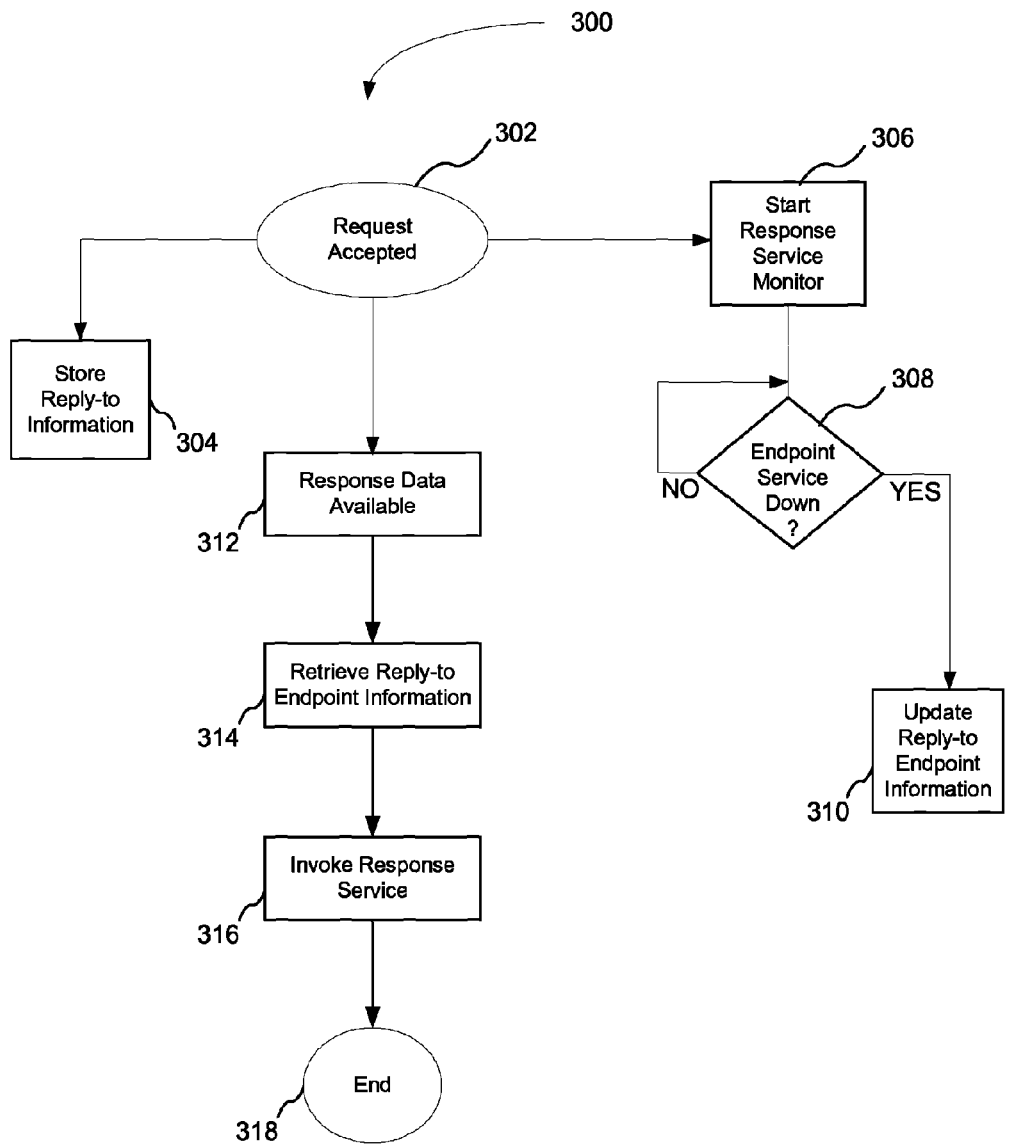
FIG. 3 illustrates a process that may be utilized by the preemptive response architecture shown in FIG. 1.

FIG. 3 illustrates a process 300 that may be utilized by the preemptive response architecture 100 shown in FIG. 1. At a process block 302, the process 300 accepts the request. Further, at a process block 304, the process 300 stores the reply-to information. In addition, at a process block 306, the process 300 starts the response service monitor 108. The process 300 proceeds to a decision block 308 to determine if the endpoint service is down. If the endpoint service is not down, the process 300 continues to iterate through the decision block 308 to determine if the endpoint service is down. If the endpoint service is down, the process 300 proceeds to a process block 310 to update the reply-to endpoint information.

While the process 300 is performing the monitoring discussed above, the process 300 proceeds to a process block 312 when response data becomes available so that a response can be sent. Further, the process 300 proceeds to a process block 314 to retrieve reply-to endpoint information. If the original endpoint service that was initially indicated in the stored reply-to endpoint information is not down as determined by the response service monitor 108, then the original reply-to endpoint information is retrieved. On the other hand, if the original endpoint service that was initially indicated in the stored reply-to endpoint information is down, the updated reply-to endpoint information is retrieved. In one embodiment, the process 300 does not distinguish whether the reply-to endpoint information is original or updated when the process 300 retrieves the reply-to endpoint information. The process 300 retrieves the reply-to endpoint information that is currently stored in the storage medium 104 when the response data becomes available irrespective of whether that reply-to endpoint information was original or updated. The process 300 then proceeds to a process block 316 to invoke the response service. Finally, the process 300 ends at a process block 318.

Figure 4:
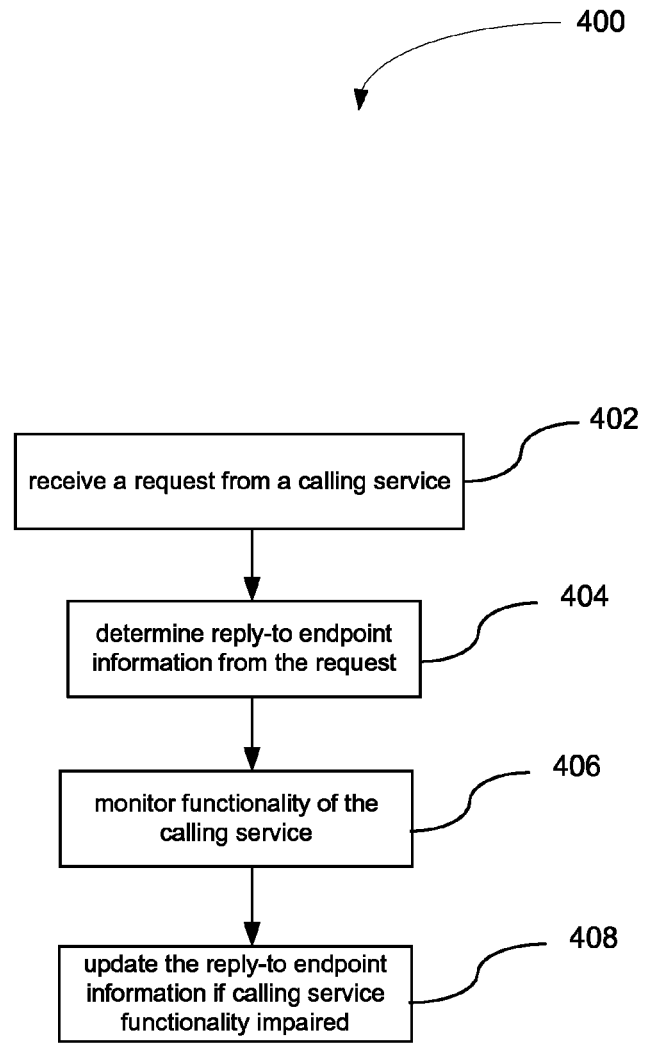
FIG. 4 illustrates a process that may be utilized to perform preemptive routing.

FIG. 4 illustrates a process 400 that may be utilized to perform preemptive routing. At a process block 402, the process 400 receives a request from a calling service. In one embodiment, the request is asynchronously received from the calling service. Further, at a process block 404, the process 400 determines reply-to endpoint information from the request. The reply-to endpoint information indicates the calling service as a calling service response endpoint. In addition, at a process block 406, the process 400 monitors functionality of the calling service. At a process block 408, the process 400 updates the reply-to endpoint information to indicate an alternative calling service as the calling service response endpoint if the functionality of the calling service is impaired prior to availability of response data for composition of a response.

Figure 5:
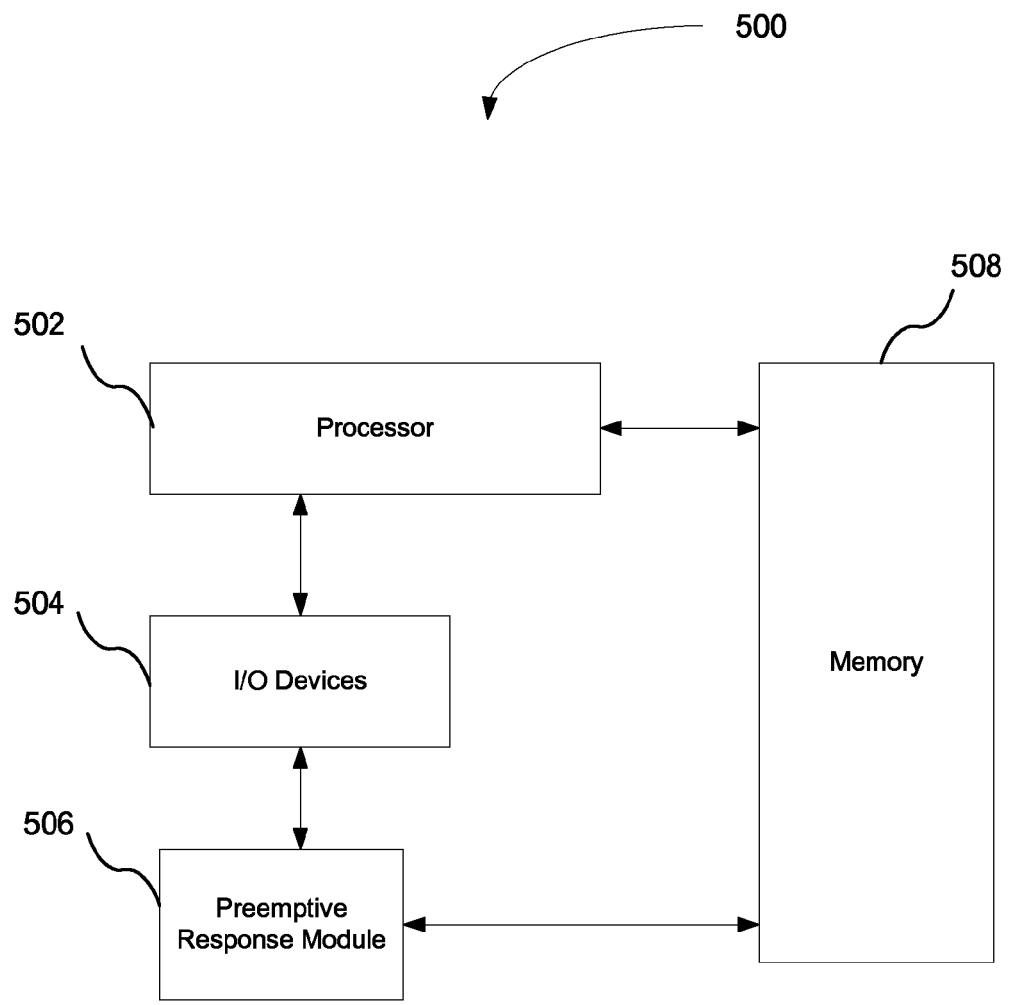
FIG. 5 illustrates a block diagram of a system that utilizes a preemptive response architecture.

FIG. 5 illustrates a block diagram of a system 500 that utilizes a preemptive response architecture. In one embodiment, the system 500 is suitable for storing and/or executing program code and is implemented using a general purpose computer or any other hardware equivalents. Thus, the system 500 comprises a processor 502, a memory 508, e.g., random access memory ("RAM") and/or read only memory ("ROM"), a preemptive response module 506, and various input/output devices 504.

The processor 502 is coupled, either directly or indirectly, to the memory 508 through a system bus. The memory 508 can include local memory employed during actual execution of the program code, bulk storage, and/or cache memories which provide temporary storage of at least some program code in order to reduce the number of times code must be retrieved from bulk storage during execution.

The input/output devices 504 can be coupled directly to the system 500 or through intervening input/output controllers. Further, the input/output devices 504 can include a keyboard, a keypad, a mouse, a microphone for capturing speech commands, a pointing device, and other user input devices that will be recognized by one of ordinary skill in the art. Further, the input/output devices 504 can include a receiver, transmitter, speaker, display, image capture sensor, biometric sensor, etc. In addition, the input/output devices 504 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A computer program product comprising a computer useable storage device having a computer readable program stored thereon, wherein the computer readable program when executed on a computer causes the computer to:
   receive an asynchronous request from a calling service, wherein a response with response data that is obtained for the asynchronous request is returned;
   determine reply-to endpoint information from the asynchronous request as original reply-to endpoint information indicating the calling service as a calling service response endpoint;
   monitor functionality of the calling service;
   in response to determining that the functionality of the calling service is impaired prior to availability of the response data,
      update the original reply-to endpoint information with updated reply-to endpoint information to indicate an alternative calling service as the calling service response endpoint that is to receive the response with response data instead of the calling service that issued the asynchronous request;
      obtain the response data; and
      provide the response with the response data to the alternative calling service using the updated reply-to endpoint information; and
   in response to determining that the functionality of the calling service is not impaired prior to availability of the response data, provide the response with the response data to the calling service that issued the asynchronous request using the original reply-to endpoint information.

2. The computer program product of claim 1, wherein the response is provided through invocation of a response service.

3. The computer program product of claim 1, wherein the alternative calling service is statically generated.

4. The computer program product of claim 1, wherein the alternative calling service is dynamically generated.

5. The computer program product of claim 1, wherein the reply-to endpoint information includes an identifier that indicates both the asynchronous request and the response.

6. The computer program product of claim 1, wherein the reply-to endpoint information includes an identifier that indicates a type of service through which the response is to be provided.

7. The computer program product of claim 1, wherein the reply-to endpoint information includes a protocol that indicates how the service is to be provided.

8. The computer program product of claim 1, wherein the reply-to endpoint information includes a service specific location to which the response is to be provided.

9. A method comprising:
   receiving an asynchronous request from a calling service, wherein a response with response data that is obtained for the asynchronous request is returned;
   determining reply-to endpoint information from the asynchronous request as original reply-to endpoint information indicating the calling service as a calling service response endpoint;
   monitoring functionality of the calling service;
   in response to determining that the functionality of the calling service is impaired prior to availability of the response data, updating the original reply-to endpoint information with updated reply-to endpoint information to indicate an alternative calling service as the calling service response endpoint that is to receive the response with response data instead of the calling service that issued the asynchronous request;

obtaining the response data; and providing the response to the alternative calling service using the updated reply-to endpoint information; and in response to determining that the functionality of the calling service is not impaired prior to availability of the response data, provide the response with the response data to the calling service that issued the asynchronous request using the original reply-to endpoint information.

10. The method of claim 9, wherein the response is provided through invocation of a response service.

11. The method of claim 9, wherein the alternative calling service is statically generated.

12. The method claim 9, wherein the alternative calling service is dynamically generated.

13. The method of claim 9, wherein the reply-to endpoint information includes an identifier that indicates both asynchronous the request and the response.

14. The method of claim 9, wherein the reply-to endpoint information includes an identifier that indicates a type of service through which the response is to be provided.

15. The method of claim 9, wherein the reply-to endpoint information includes a protocol that indicates how the service is to be provided.

16. A system comprising:
a processor; and
storage coupled to the processor, wherein the storage stores a computer readable program, and wherein the processor executes the computer readable program to perform operations, wherein the operations comprise:
receiving an asynchronous request from a calling service, wherein a response with response data that is obtained for the asynchronous request is returned;
determining reply-to endpoint information from the asynchronous request as original reply-to endpoint information indicating the calling service as a calling service response endpoint;
monitoring functionality of the calling service;
in response to determining that the functionality of the calling service is impaired prior to availability of the response data,
updating the original reply-to endpoint information with updated reply-to endpoint information to indicate an alternative calling service as the calling service response endpoint that is to receive the response with response data instead of the calling service that issued the asynchronous request;
obtaining the response data; and
providing the response to the alternative calling service using the updated reply-to endpoint information; and
in response to determining that the functionality of the calling service is not impaired prior to availability of the response data, provide the response with the response data to the calling service that issued the asynchronous request using the original reply-to endpoint information.

17. The system of claim 16, wherein the reply-to endpoint information includes an identifier that indicates both the asynchronous request and the response.

18. The system of claim 16, wherein the reply-to endpoint information includes an identifier that indicates a type of service through which the response is to be provided.

19. The system of claim 16, wherein the reply-to endpoint information includes a protocol that indicates how the service is to be provided.

20. The system of claim 16, wherein the response is provided through invocation of a response service.

21. The system of claim 16, wherein the alternative calling service is statically generated.

22. The system of claim 16, wherein the alternative calling service is dynamically generated.

23. The system of claim 16, wherein the reply-to endpoint information includes a service specific location to which the response is to be provided.

24. The method of claim 9, wherein the reply-to endpoint information includes a service specific location to which the response is to be provided.

* * * * *